(12) United States Patent
Sawada et al.

(10) Patent No.: US 7,473,468 B2
(45) Date of Patent: Jan. 6, 2009

(54) COLORANT FOR THERMOPLASTIC RESIN AND USES THEREOF

(75) Inventors: Seiji Sawada, Tokyo (JP); Kenichi Kobayashi, Tokyo (JP); Junichi Suzuki, Tokyo (JP); Masashi Koide, Tokyo (JP)

(73) Assignee: Toyo Ink Mfg. Co., Ltd., Tokyo (JP)

( * ) Notice: Subject to any disclaimer, the term of this patent is extended or adjusted under 35 U.S.C. 154(b) by 436 days.

(21) Appl. No.: 10/577,060

(22) PCT Filed: Sep. 13, 2004

(86) PCT No.: PCT/JP2004/013310

§ 371 (c)(1),
(2), (4) Date: Apr. 24, 2006

(87) PCT Pub. No.: WO2005/040287

PCT Pub. Date: May 6, 2005

(65) Prior Publication Data

US 2007/0078201 A1    Apr. 5, 2007

(30) Foreign Application Priority Data

Oct. 24, 2003 (JP) ............... 2003-364429
Nov. 27, 2003 (JP) ............... 2003-397093

(51) Int. Cl.
*B32B 19/04* (2006.01)
*B32B 9/04* (2006.01)

(52) U.S. Cl. ............ 428/403; 428/407; 524/431

(58) Field of Classification Search .......... None
See application file for complete search history.

(56) References Cited

U.S. PATENT DOCUMENTS 4,681,637 A * 7/1987 Rademachers et al. ...... 106/425
4,798,856 A * 1/1989 Ayala et al. ............ 524/386

FOREIGN PATENT DOCUMENTS

| JP | 5-81623 | 11/1993 |
| JP | 08-053116 | 2/1996 |
| JP | 08-059398 | 3/1996 |
| JP | 2000-309324 | 11/2000 |
| JP | 2002-161221 | 6/2002 |
| JP | 2002-298330 | 10/2002 |
| JP | 2004-231609 A * | 8/2004 |

OTHER PUBLICATIONS

Computer-generated translation for JP 2004-231609.*

* cited by examiner

*Primary Examiner*—Marc S Zimmer
(74) *Attorney, Agent, or Firm*—Oblon, Spivak, McClelland, Maier & Neustadt, P.C.

(57) ABSTRACT

It is an object of the present invention to provide a thermoplastic resin coloring agent having excellent dispersibility, transparency, ultraviolet blocking properties, etc., and a thermoplastic resin composition employing same, and it is another object of the present invention to provide a thermoplastic resin molding having excellent dispersibility, transparency, ultraviolet blocking properties, stretchability, and surface smoothness.

The present invention relates to a thermoplastic resin coloring agent containing a surface-treated α-ferric oxide (A) formed by coating a non-acicular α-ferric oxide having an average particle size of 0.01 to 0.06 μm and an aspect ratio of 0.2 to 1.0 with a polyhydric alcohol and an organopolysiloxane, and an oxycarboxylic acid metal salt (B1) as a dispersing agent (B) and, moreover, to the thermoplastic resin coloring agent further containing a methine-based dye (C). The present invention also relates to a thermoplastic resin composition and a molding obtained using the thermoplastic resin coloring agent. Furthermore, the present invention relates to a molding obtained by coating the molding with a carbon film.

32 Claims, No Drawings

COLORANT FOR THERMOPLASTIC RESIN AND USES THEREOF

TECHNICAL FIELD

The present invention relates to a thermoplastic resin coloring agent and a thermoplastic resin composition. More particularly, it relates to a thermoplastic resin molding having transparency, being capable of blocking ultraviolet rays, and having excellent surface smoothness. It further relates to a thermoplastic resin molding that blocks visible light in the vicinity of 550 nm and has gas barrier properties.

BACKGROUND ART

Since thermoplastic resins have excellent heat resistance and weatherability and are inexpensive in terms of cost, they are used for various types of moldings such as films and hollow moldings. In particular, the use of condensation type thermoplastic resins such as polyester resins, styrene resins, polycarbonate resins, and acrylic resins in food packaging, cosmetics packaging, etc. instead of glass bottles has been increasing because of advantageous properties such as transparency, design versatility, and light weight.

Glass bottles for beer, liquor, etc. have a brownish hue. For coloring polyester resin bottles, while taking into consideration leaching into products and heat resistance, an α-ferric oxide having an average particle size of 0.1 μm or less, known as particulate iron oxide, is generally used (ref. Japanese Examined Patent Publication No. 5-81623). In particular, for stability of the contents, it is necessary for beer containers to provide at least 96% blocking in a ultraviolet region of 420 nm or less and more than 70% blocking in a visible region in the vicinity of 550 nm, and gas barrier properties are also necessary. That is, in terms of light transmittance, unless it is less than 4% in the ultraviolet region of 420 nm or less and no greater than 30% in the visible region in the vicinity of 550 nm, there is a problem in terms of protecting the contents. However, the above-mentioned α-ferric oxide has a problem with aggregation, etc. during a production process, and the dispersibility is bad and inadequate.

Furthermore, although a technique employing α-ferric oxide particles, which are relatively resistant to aggregation, has been disclosed (ref. Japanese Unexamined Patent Publication No. 8-59398), it is difficult to satisfy the above-mentioned properties.

Moreover, there is the problem that thermoplastic resin moldings in general have poor gas barrier properties, and contents are degraded. As means for solving this, there is a technique of coating a molding with a carbon film (ref. Japanese Unexamined Patent Publication Nos. 8-53116 and 2000-309324), and although the gas barrier properties are sufficient, the blocking of ultraviolet rays is inadequate. Furthermore, the particulate iron oxide disclosed in Japanese Patent Publication No. 5-81623 has high thermal aggregability, the pigment aggregates during a molding process, the transparency deteriorates, the appearance is degraded by the formation of aggregations, and the gas barrier properties are inadequate due to the formation of voids around the particulate iron oxide.

DISCLOSURE OF INVENTION

It is an object of the present invention to provide a thermoplastic resin coloring agent having excellent transparency, dispersibility, and ultraviolet blocking properties, and a thermoplastic resin composition employing same. It is another object of the present invention to provide a thermoplastic resin molding having excellent transparency and surface smoothness, the molding being capable of blocking ultraviolet rays and further blocking visible rays in the vicinity of 550 nm as necessary. It is yet another object thereof to provide a molding formed by coating the above molding with a carbon film, the molding having gas barrier properties.

The present invention is a thermoplastic resin coloring agent that includes a surface-treated α-ferric oxide (A) formed by coating a non-acicular α-ferric oxide having an average particle size of 0.01 to 0.06 μm and an aspect ratio of 0.2 to 1.0 with a polyhydric alcohol and an organopolysiloxane, and an oxycarboxylic acid metal salt (B1) as a dispersing agent (B).

Furthermore, the present invention is the thermoplastic resin coloring agent wherein the oxycarboxylic acid metal salt (B1) is a 12-hydroxystearic acid metal salt.

Moreover, the present invention is the thermoplastic resin coloring agent wherein the 12-hydroxystearic acid metal salt is calcium 12-hydroxystearate.

Furthermore, the present invention is a thermoplastic resin coloring agent that includes a surface-treated α-ferric oxide (A) formed by coating a non-acicular α-ferric oxide having an average particle size of 0.01 to 0.06 μm and an aspect ratio of 0.2 to 1.0 with a polyhydric alcohol and an organopolysiloxane, and a higher fatty acid metal salt (B2) as a dispersing agent (B).

Moreover, the present invention is the thermoplastic resin coloring agent wherein the polyhydric alcohol and the organopolysiloxane are each 0.01 to 10 wt % relative to the entirety of the surface-treated α-ferric oxide (A).

Furthermore, the present invention is the thermoplastic resin coloring agent wherein the polyhydric alcohol is trimethylolpropane or trimethylolethane.

Moreover, the present invention is the thermoplastic resin coloring agent wherein the organopolysiloxane is dimethyl polysiloxane or methyl hydrogen polysiloxane.

Furthermore, the present invention is the thermoplastic resin coloring agent wherein 40 to 150 parts by weight of the dispersing agent (B) is added to 100 parts by weight of the surface-treated α-ferric oxide (A).

Moreover, the present invention is the thermoplastic resin coloring agent wherein the thermoplastic resin coloring agent includes a methine-based dye (C).

Furthermore, the present invention is the thermoplastic resin coloring agent wherein the methine-based dye (C) is C.I. No. Solvent Brown 53.

Moreover, the present invention is a thermoplastic resin composition obtained by mixing the thermoplastic resin coloring agent, a methine-based dye (C), and a thermoplastic resin.

Furthermore, the present invention is the thermoplastic resin composition wherein the methine-based dye (C) is C.I. No. Solvent Brown 53.

Moreover, the present invention is a thermoplastic resin composition obtained by mixing the thermoplastic resin coloring agent and a thermoplastic resin.

Furthermore, the present invention is the thermoplastic resin composition wherein the thermoplastic resin is a polyester resin.

Moreover, the present invention is the thermoplastic resin composition wherein the thermoplastic resin is a microbially disintegrable resin.

Furthermore, the present invention is a molding obtained by using the thermoplastic resin coloring agent.

Moreover, the present invention is a molding obtained by using the thermoplastic resin composition.

Furthermore, the present invention is a molding formed by coating the surface of the molding with a carbon film.

The disclosures of the present invention relate to subject matter described in Japanese Patent Application No. 2003-364429, filed on Oct. 24, 2003 and Japanese Patent Application No. 2003-397093, filed on Nov. 27, 2003, and the contents of the disclosures therein are incorporated herein by reference.

BEST MODE FOR CARRYING OUT THE INVENTION

The thermoplastic resin coloring agent of the present invention includes a surface-treated α-ferric oxide (A) and a dispersing agent (B).

The surface-treated α-ferric oxide (A) is formed by coating an α-ferric oxide with a polyhydric alcohol and an organopolysiloxane.

The α-ferric oxide used in the present invention has an average particle size of 0.01 to 0.06 μm, and preferably 0.03 to 0.05 μm. If the average particle size is less than 0.01 μm, there is the possibility of particle aggregation and poor dispersion; if it exceeds 0.06 μm, the surface roughness of a molding becomes too high, and there is the possibility that the surface smoothness and the transparency might deteriorate and the appearance of the molding might be degraded due to aggregation of the α-ferric oxide. The average particle size referred to here means a value at which a particle size distribution with the average of the minor axis and the major axis as a particle size exhibits a maximum value.

Furthermore, the α-ferric oxide used in the present invention has a non-acicular form having an aspect ratio of 0.2 to 1.0, and may be obtained by a method disclosed in Japanese Unexamined Patent Publication No. 8-59398. The aspect ratio referred to here is the ratio (minor axis/major axis) of the minor axis to the major axis by electron microscopic observation. In order to obtain a molding having good transparency and dispersibility, a true sphere (minor axis/major axis=1.0) is most preferable.

In the present invention, as a surface treatment agent for the α-ferric oxide, a polyhydric alcohol and an organopolysiloxane are used together.

The surface treatment of the α-ferric oxide with the polyhydric alcohol is for the purpose of imparting low polarity to the particle surface and preventing re-aggregation of particles.

Specific examples of the polyhydric alcohol include alkylene glycols such as ethylene glycol, propylene glycol, 1,3-butanediol, and tetramethylene glycol, polyoxyalkylene glycols such as diethylene glycol, triethylene glycol, polyethylene glycol, dipropylene glycol, tripropylene glycol, and polypropylene glycol, and polyhydric alcohols such as glycerol, trimethylolpropane, trimethylolethane, pentaerythritol, sorbitol, 1,2,6-hexanetriol, inositol, and polyvinyl alcohol. Preferred examples thereof include trimethylolpropane (TMP) and trimethylolethane (TME). These polyhydric alcohols may be used singly or in a combination of two or more types.

The surface treatment of the α-ferric oxide with the organopolysiloxane is for the purpose of making the particle surface hydrophobic, improving the wettability of the particles with a resin, suppressing a decrease in molecular weight of a resin, and maintaining physical properties.

Specific examples of the organopolysiloxane include polydimethylsiloxanes such as dimethyl polysiloxane, methyl hydrogen polysiloxane, methyl phenyl polysiloxane, and various types of modified polysiloxanes, alcohol-modified polysiloxanes, ether-modified polysiloxanes, and fluorine-modified polysiloxanes. These organopolysiloxanes may be used singly or in a combination of two or more types. Methyl hydrogen polysiloxane and dimethyl polysiloxane are preferable.

Furthermore, the methyl hydrogen polysiloxane cited as an example above is desirably one represented by the formula below.

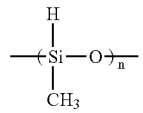

[Chem. 1]

(In the formula, n denotes a positive integer and is preferably 12 or less.)

The amounts of polyhydric alcohol and organopolysiloxane are each preferably 0.01 to 10 wt % relative to the entirety of the surface-treated α-ferric oxide (A). If they exceed 10 wt %, it is not economical, the polyhydric alcohol or the organopolysiloxane tends to undergo self-decomposition, etc. during a production process, or a molding that is produced might contain bubbles, aggregations, etc. If they are less than 0.01 wt %, the amount of polyhydric alcohol or organopolysiloxane with which the iron oxide surface is coated is not sufficient, there is a tendency for dispersion in a resin to become poor, and a molding might be given poor physical properties. They are more preferably 0.1 to 2 wt %, and particularly preferably 0.5 to 1 wt %.

A method for coating the α-ferric oxide with the above-mentioned surface treatment agent may employ a known method such as a wet treatment or a dry treatment.

With regard to the wet treatment, there are a method in which the α-ferric oxide and a surface treatment agent are immersed in a polar solvent such as water or an alcohol such as ethanol, mixed uniformly using a high shear force mixer such as a Henschel mixer or a Super mixer, and the solvent is then removed by evaporation and drying, a method in which a surface treatment agent is dispersed or dissolved in a solvent, which is then mixed with the α-ferric oxide, etc.

In the wet treatment, it is preferable to carry out a step of thermally drying the α-ferric oxide particles during or after surface treatment, since the moisture content due to moisture adsorption can be greatly suppressed. Since a low moisture content iron oxide thus obtained can suppress degradation of a resin when kneading and dispersing it in the resin there are various advantages, such as any decrease in the molecular weight of resin being suppressed and the mechanical properties of a molding being maintained.

With regard to the dry treatment, a surface treatment agent is added when the α-ferric oxide is ground using a fluid energy grinder such as a micronizer or a jet mill or a stirrer such as a Super mixer or a Henschel mixer. As a fluid for the fluid energy grinder, compressed air, heated compressed air, steam, etc. is normally used. Furthermore, when the polyhydric alcohol is a solid at normal temperature, a solution of the polyhydric alcohol dissolved in a solvent may be used in the above-mentioned treatment step. For example, an ethanol solution or water/ethanol (1:1) solution of trimethylolethane may be used.

In the surface treatment of the α-ferric oxide, it is preferable to carry out coating with a polyhydric alcohol by the wet treatment and coating with an organopolysiloxane by the dry treatment. Furthermore, subsequent to the surface treatment, by intensively grinding, using an air mill, etc., particles aggregated in the surface treatment step, the dispersibility may be further improved.

Surface treatment of the α-ferric oxide may be carried out simultaneously with the polyhydric alcohol and the organopolysiloxane, or may first be carried out with the organopolysiloxane and subsequently with the polyhydric alcohol.

As one of the causes for aggregation of α-ferric oxide particles, moisture can be cited. Since the surface of α-ferric oxide particles has relatively high hydrophilicity, by first coating hydrophilic groups on the surface of the particles with the polyhydric alcohol, an effect in preventing moisture adsorption in a subsequent step is exhibited. Furthermore, by thermally drying the α-ferric oxide subsequent to the treatment with the polyhydric alcohol, the moisture content due to moisture adsorption, etc. can be greatly reduced.

By coating the α-ferric oxide that has been treated with the polyhydric alcohol with a hydrophobic organopolysiloxane, a surface-treated α-ferric oxide (A) having good dispersibility and suppressed particle re-aggregation can be obtained.

Furthermore, since the surface-treated α-ferric oxide (A) suppresses thermal aggregation thereof in a step of melt-kneading with a thermoplastic resin such as a polyester, it is dispersed well in a thermoplastic resin molding, and the transparency of the molding is improved.

Moreover, it is preferable if the moisture content on the surface of the surface-treated α-ferric oxide (A) is low since an effect, such as hydrolysis, toward a thermoplastic resin can be suppressed. It is preferable for the moisture content to be less than 0.3%.

The amount of surface treatment agent coating may be adjusted to a predetermined amount of coating by a known method involving changing the weight of α-ferric oxide treated and the supply concentration or the supply flow rate of the surface treatment agent.

With regard to the dispersing agent (B) in the thermoplastic resin coloring agent of the present invention, an oxycarboxylic acid metal salt (B1) or a higher fatty acid metal salt (B2) is used. They may be used singly or in a combination of two or more types.

The oxycarboxylic acid in the oxycarboxylic acid metal salt (B1) is not particularly limited as long as it is a compound having a carboxyl group and a hydroxyl group, and examples thereof include aliphatic and aromatic oxycarboxylic acids. The dispersibility of the α-ferric oxide increases due to the oxycarboxylic acid metal salt (B1), and it is therefore possible to obtain a molding having high transparency as well as maintain a high value for the intrinsic viscosity (IV), particularly when a polyester resin such as polyethylene terephthalate (PET), a polycarbonate, a polylactic acid, etc. is used. The IV referred to here represents the state of resin degradation (hydrolysis); the higher the value, the lower the resin degradation and the more excellent it is in terms of processability.

With regard to the aliphatic oxycarboxylic acid, those having 10 to 30 carbons are preferable, and examples thereof include α-hydroxymyristic acid, α-hydroxypalmitic acid, α-hydroxystearic acid, α-hydroxyeicosanoic acid, α-hydroxydocosanoic acid, α-hydroxytetraeicosanoic acid, α-hydroxyhexaeicosanoic acid, α-hydroxyoctaeicosanoic acid, α-hydroxytriacontanoic acid, β-hydroxymyristic acid, 10-hydroxydecanoic acid, 15-hydroxypentadecanoic acid, 16-hydroxyhexadecanoic acid, 12-hydroxystearic acid, and ricinoleic acid. They may be used singly or in a combination of two or more types. While taking into consideration the availability of starting materials, 12-hydroxystearic acid is particularly preferable.

Other examples of the aliphatic oxycarboxylic acid include glycolic acid, lactic acid, hydroacrylic acid, α-oxybutyric acid, α-hydroxyisobutyric acid, δ-hydroxycaproic acid, α-hydroxydotriacontanoic acid, α-hydroxytetratriacontanoic acid, α-hydroxyhexatriacontanoic acid, α-hydroxyoctatriacontanoic acid, α-hydroxytetracontanoic acid, glyceric acid, tartronic acid, malic acid, and citric acid. Examples of the aromatic oxycarboxylic acid include salicylic acid, m-oxybenzoic acid, p-oxybenzoic acid, gallic acid, mandelic acid, and trobic acid.

With regard to the metal in the oxycarboxylic acid metal salt (B1), lithium, which is an alkali metal, and magnesium and calcium, which are alkaline earth metals, are preferable. Furthermore, in the case of the 12-hydroxystearic acid metal salt, magnesium and calcium, which can be used with FAD approval, are preferable. These metal salts may be used singly or in a combination of two or more types.

It is preferable that the 12-hydroxystearic acid metal salt is in the form of a fine powder. Moreover, with regard to a method for producing the 12-hydroxystearic acid metal salt, there are a double decomposition precipitation method, a dry process direct method, etc., and any may be used. It is preferable to employ the dry process direct method since a 12-hydroxystearic acid metal salt having a low moisture content can be obtained, and when melt-kneading with a thermoplastic resin the effect of a decrease in the molecular weight of the thermoplastic resin can be suppressed.

As the higher fatty acid in the higher fatty acid metal salt (B2), an aliphatic carboxylic acid having 10 to 30 carbons can be cited.

Specific examples thereof include stearic acid, oleic acid, lauric acid, behenic acid, behenic acid, myristic acid, and montanic acid. Examples of the metal of the aliphatic carboxylic acid metal salt include calcium, magnesium, lithium, aluminum, zinc, sodium, and potassium. Calcium stearate and magnesium stearate are particularly preferable.

A methine-based dye (C), which is used as necessary in the thermoplastic resin coloring agent of the present invention, is one having good heat resistance and little sublimation. Specific examples thereof include Color Index (C.I.) Solvent Brown 53, C.I. Solvent Yellow 133, C.I. Solvent Violet 49, and C.I. Pigment Orange 70. They may be used singly or in combination. In particular, C.I. Solvent Brown 53, which has a brown hue, is an FDA registered product and is therefore used preferably.

With regard to a thermoplastic resin used as a base resin of the thermoplastic resin composition of the present invention or as a molding resin in a molding, there are, among conventionally known resins, resins having transparency, specifically, polyester resins, styrene resins, polycarbonate resins, acrylic resins, etc. Specific examples thereof include a polyester resin, a styrene resin, a polycarbonate resin, and an acrylic resin having transparency. A polyester resin is particularly preferable.

The polyester resin may be obtained by condensation polymerization of an aromatic carboxylic acid such as terephthalic acid, isophthalic acid, naphthalene-2,6-dicarboxylic acid, or 4,4-diphenyldicarboxylic acid or an ester thereof with an aliphatic glycol such as ethylene glycol, propylene glycol, 1,4-butanediol, diethylene glycol, or 1,4-cyclohexanedimethanol. Representative examples thereof include PET and polybutylene terephthalate.

These polyester resins may be a combination of a plurality of types of carboxylic acid component and a plurality of types of diol component. That is, the polyester resin may be a copolymer formed by copolymerization by adding a third component to a homopolymer (main constituent) formed from the above-mentioned aromatic carboxylic acid component and aliphatic glycol component. With regard to this third component, in the case where the main constituent is ethylene terephthalate, examples thereof include diols such as diethylene glycol, propylene glycol, neopentyl glycol, polyalkylene glycol, and 1,4-cyclohexanedimethanol; dicarboxylic acids such as succinic acid, adipic acid, sepacic acid, phthalic acid, isophthalic acid, and 2,6-naphthalenedicarboxylic acid; and polyfunctional polycarboxylic acids such as trimellitic acid and pyromellitic acid. Furthermore, in the case where the main constituent is ethylene-2,6-naphthalate, the above-mentioned third components (with the proviso that 2,6-naphthalenedicarboxylic acid is changed to terephthalic acid) can be cited as examples.

Moreover, as the thermoplastic resin used in the present invention, a microbially disintegrable resin may also be used. Specific examples thereof include polylactic acid, polycaprolactone, an aliphatic polyester-based resin obtained using an aliphatic dicarboxylic acid and a polyhydric alcohol as starting materials and, in addition, a polyester resin synthesized by a microbe or a plant. Polylactic acid is particularly preferable.

Specific examples thereof include polybutylene succinate, polyethylene succinate, and polybutylene succinate adipate, manufactured by Showa Highpolymer Co., Ltd. or Nippon Shokubai Co., Ltd., polylactic acid manufactured by Mitsui Chemical Co., Ltd., Cargill, or Shimadzu Corporation, polycaprolactone manufactured by Daicel Chemical Industries, Ltd., and poly(3-hydroxybutyric acid-CO-3-hydroxyvaleric acid) (P(3HB-3HV)), poly(3-hydroxybutyric acid-CO-4-hydroxybutyric acid) (P(3HB-4HB)), and poly(3-hydroxybutyric acid-CO-3-hydroxypropionate) (P(3HB-3HP)) manufactured by Monsanto, which are commercial products or experimental products. As product names, LACEA H100J (Mitsui Chemical Co., Ltd.), TARFLON IVB 2500 (manufactured by Idemitsu Kosan Co., Ltd.), TEONITE TN8065S (Teijin Ltd.), etc. can be cited.

It is preferable that the base resin in the thermoplastic resin composition and the molding resin in the molding are the same or are compatible with each other.

By mixing the surface-treated $\alpha$-ferric oxide (A) and the dispersing agent (B) by means of a Henschel mixer, a Super Floater, a Pony mixer, etc., the thermoplastic resin coloring agent of the present invention may be produced. It is particularly preferable that the dispersing agent (B) is mixed at a proportion of 40 to 150 parts by weight relative to 100 parts by weight of the surface-treated $\alpha$-ferric oxide (A).

The thermoplastic resin coloring agent of the present invention may also be produced by mixing the surface-treated $\alpha$-ferric oxide (A), the dispersing agent (B), and the methine-based dye (C) in the same manner. In this case, the methine-based dye (C) may be added to a mixture of the $\alpha$-ferric oxide (A) and the dispersing agent (B), or the $\alpha$-ferric oxide (A), the dispersing agent (B), and the methine-based dye (C) may be mixed simultaneously.

With regard to the thermoplastic resin coloring agent formed from the surface-treated $\alpha$-ferric oxide (A) and the dispersing agent (B), the thermoplastic resin composition (master batch or compound) of the present invention may be produced by extruding the coloring agent together with a thermoplastic resin by means of a single shaft or twin shaft extruder.

Furthermore, with regard to the thermoplastic resin coloring agent formed from the surface-treated $\alpha$-ferric oxide (A) and the dispersing agent (B), the thermoplastic resin composition of the present invention may be produced by extruding the coloring agent together with the methine-based dye (C) and a thermoplastic resin by means of a single shaft or twin shaft extruder.

Moreover, with regard to the thermoplastic resin coloring agent formed from the surface-treated $\alpha$-ferric oxide (A), the dispersing agent (B), and the methine-based dye (C), the thermoplastic resin composition of the present invention may be produced by extruding the coloring agent together with a thermoplastic resin.

In these thermoplastic resin compositions, it is preferable that in the case of a master batch the content of the surface-treated $\alpha$-ferric oxide (A) is 0.01 to 60 parts by weight relative to 100 parts by weight of the thermoplastic resin, and in the case of a compound it is 0.01 to 3 parts by weight. Furthermore, when the methine-based dye (C) is included, it is preferable that in the case of a master batch the content is 0.001 to 4 parts by weight, and in the case of a compound it is 0.001 to 0.2 parts by weight.

The molding of the present invention may be produced by sprinkling the thermoplastic resin coloring agent as it is over a thermoplastic resin for molding, which is then subjected to melt-kneading and molding.

Furthermore, the molding of the present invention may also be produced by mixing the thermoplastic resin coloring agent and a thermoplastic resin to thus prepare a thermoplastic resin composition (master batch), mixing this thermoplastic resin composition with a molding resin (thermoplastic resin for molding), and subjecting it to melt-kneading and molding. Moreover, it may also be produced by mixing the thermoplastic resin coloring agent and a thermoplastic resin to thus prepare a thermoplastic resin composition (compound) and molding the composition as it is.

Examples of the shape of the molding include bottle, sheet, film, and plate.

The molding of the present invention has transparency and can block a ultraviolet region of up to and including 420 nm. Furthermore, when the methine-based dye (C) is included, it can further block visible rays in the vicinity of 550 nm.

However, the degree of blocking changes according to the content of each component and the thickness of the molding. As one example, with regard to a molding containing 0.22 parts by weight or greater of the surface-treated $\alpha$-ferric oxide (A) in 100 parts by weight of a thermoplastic resin, when the thickness is 0.3 mm it is transparent, and at least 99% of a ultraviolet region of up to and including 420 nm can be blocked.

Moreover, in the above-mentioned composition, when 0.01 parts by weight or greater of the methine-based dye (C) is included, more than 70% of visible rays in the vicinity of 550 nm can be blocked.

With regard to conditions that satisfy the above-mentioned characteristics, it is necessary to increase the content of the component in the molding if the thickness is less than 0.3 mm, and if it is thick the content may be low.

A light blocking ratio is a value obtained from (100%—light transmittance).

The thermoplastic resin coloring agent, the thermoplastic resin composition, and the molding of the present invention may employ a pigment or a dye according to a desired hue. Specific examples thereof include organic pigments such as azo-based, anthraquinone-based, perylene-based, perinone-based, quinacridone-based, phthalocyanine-based, isoindoline-based, dioxazine-based, indanthrene-based, and quinophthalone-based pigments, colored inorganic pigments such as zinc oxide, titanium oxide, ultramarine, cobalt blue, carbon black, and titanium yellow, extender pigments such as barium sulfate, kaolin, and talc, and oil-soluble dyes and disperse dyes such as anthraquinone-based, perylene-based, perinone-based, monoazo-based, other methine-based, heterocycle-based, lactone-based, and phthalocyanine-based pigments.

Furthermore, as a lubricant, a metal soap, that is, a higher fatty acid metal salt, or an oxycarboxylic acid metal salt may be used. Examples thereof include calcium stearate, magnesium stearate, barium stearate, zinc stearate, aluminum stearate, lithium stearate, calcium laurate, zinc laurate, magnesium laurate; and as the oxycarboxylic acid metal salt, metal salts of $\alpha$-hydroxymyristic acid, $\alpha$-hydroxypalmitic acid, $\alpha$-hydroxystearic acid, $\alpha$-hydroxyeicosanoic acid, $\alpha$-hydroxydocosanoic acid, $\alpha$-hydroxytetraeicosanoic acid, $\alpha$-hydroxyhexaeicosanoic acid, $\alpha$-hydroxyoctaeicosanoic acid, $\alpha$-hydroxytriacontanoic acid, $\beta$-hydroxymyristic acid, 10-hydroxydecanoic acid, 15-hydroxypentadecanoic acid, 16-hydroxyhexadecanoic acid, 12-hydroxystearic acid, and ricinoleic acid.

Furthermore, additives that are generally used in a thermoplastic resin molding such as an antioxidant, a ultraviolet absorber, a photostabilizer, and a metal deactivating agent may be added. As the antioxidant, a phenol-based, phosphite-based, etc. antioxidant may be used. Examples of the phenol-based antioxidant include diethyl[[3,5-bis(1,1-dimethylethyl)-4-hydroxyphenyl]methyl]phosphonate and octadecyl- 3-(3,5-di-tert-butyl-4-hydroxyphenyl)propionate. Examples of the phosphite-based antioxidant include tris(2,4-di-tert-butylphenyl)phosphite and bis(2,6-di-tert-butyl-4-methylphenyl)pentaerythritol-di-phosphite.

As a ultraviolet inhibitor, a benzotriazole-based, triazine-based, etc. ultraviolet inhibitor may be used. Examples of the benzotriazole-based ultraviolet inhibitor include 2,2-methylenebis[4-(1,1,3,3-tetramethylbutyl)-6[(2H-benzotriazol-2-yl)phenol]], 2-(2H-benzotriazol-2-yl)-4-(1,1,3,3-tetramethylbutyl)phenol, and 2-[5-chloro(2H)-benzotriazol-2-yl]-4-methyl-6-(tert-butyl)phenol. Examples of the triazine-based ultraviolet inhibitor include 2-(4,6-diphenyl-1,3,5-triazin-2-yl)-5-[(hexyl)oxy]-phenol.

As the photostabilizer, a hindered amine-based photostabilizer, etc. may be used. Examples of the hindered amine-based photostabilizer include bis(2,2,6,6-tetramethyl-4-piperidyl)sebacate, poly[{6-(1,1,3,3-tetramethylbutyl)amino-1,3,5-triazin-2,4-diyl}{(2,2,6,6-tetramethyl-4-piperidyl)imino}hexamethylene{(2,2,6,6-tetramethyl-4-piperidyl)imino}], and a polycondensate of dibutylamine/1,3,5-triazine/N,N-bis(2,2,6,6-tetramethyl-4-piperidyl-1,6-hexamethylenediamine/N-(2,2,6,6-tetramethyl-4-piperidyl)butylamine. Examples of the metal deactivating agent include 2,3-bis[[3-[3,5-di-tert-butyl-4-hydroxyphenyl]propionyl]]propionohydrazide.

The surface of the molding of the present invention is provided with a carbon film as necessary. As a starting material gas for the carbon film, one that is a gas or a liquid at normal temperature, such as an aliphatic hydrocarbon, an aromatic hydrocarbon, an oxygen-containing hydrocarbon, or a nitrogen-containing hydrocarbon, is used. It is particularly desirable to use acetylene, benzene, toluene, o-xylene, m-xylene, p-xylene, or cyclohexane. These starting material gases may be used singly or as a mixed gas of two or more types. Furthermore, these gases may be used by diluting with a noble gas such as argon or helium.

The carbon film used in the present invention is an i carbon film formed from a diamond-like coating (DLC) film or a hard carbon film, also known as a hydrogenated amorphous carbon film ($\alpha$-C:H), and is preferably an amorphous carbon film in which SP3 bonding is the main constituent.

The thickness of the carbon film depends on the output of high frequency waves, the pressure of the starting material gas, the flow rate of the supplied gas, the plasma generation time, self-bias, the type of starting material, etc., but it is preferably in the range of 50 to 1000 Å in order to achieve a balance between an effect of suppressing sorption of low molecular weight organic compounds, an effect of improving the gas barrier properties, adhesion to a condensed thermoplastic resin, durability, and transparency. It is particularly preferably 200 to 300 Å. Formation of the DLC film is influenced by the smoothness of the surface of a molding that is a target to be coated with the film. That is, if the surface of the molding is smooth, a uniform coating can be achieved, but it is very difficult to coat projections, and uniform coating cannot be obtained. There is therefore a possibility that if it is less than 50 Å, coating might not be carried out sufficiently, and the gas barrier might not be sufficient.

The film properties of the carbon film also depend on the output of high frequency waves, the pressure of the starting material gas, the flow rate of the supplied gas, the plasma generation time, self-bias, the type of starting material, etc. An increase in the output of the high frequency waves, a decrease in the pressure of the starting material gas, a decrease in the flow rate of the supplied gas, an increase in the self-bias, a decrease in the number of carbons of the starting material, etc. all cause hardening of the DLC film, an improvement in compactness, an increase in compressive stress, and an increase in brittleness. Because of this, in order to exhibit a maximum gas barrier effect while maintaining adhesion to the resin surface and durability of the film, it is preferable for the high frequency wave output to be set at 50 to 2000 W, the starting material gas pressure to be set at 0.1 to 0.8 torr, the flow rate of the supplied gas to be set at 50 to 150 mL/min., the self-bias to be set at −200 to −1000 V, and the number of carbons of the starting material gas to be set at on the order of 1 to 8.

In order to further improve the adhesion between the DLC film and the resin surface, prior to formation of the DLC film the surface of the resin molding may be activated by subjecting it to a plasma treatment with an inorganic gas such as argon or oxygen.

Although the gas permeability of the molding of the present invention that is coated with the carbon film depends on the thickness of the carbon film, it is, for example, preferably less than 0.0030 mL/bottle·24 hours·atm in the case of oxygen. It is particularly preferably less than 0.0010 mL/bottle·24 hours·atm.

Since the thermoplastic resin coloring agent of the present invention includes the surface-treated $\alpha$-ferric oxide (A) formed by coating, with a polyhydric alcohol and an organopolysiloxane, a non-acicular $\alpha$-ferric oxide having an average particle size of 0.01 to 0.06 μm and an aspect ratio of 0.2 to 1.0, and an oxycarboxylic acid metal salt (B1) as the dispersing agent (B), it is possible to disperse the surface-treated $\alpha$-ferric oxide (A) well, suppress degradation of a resin when forming a resin molding, impart transparency, and block ultraviolet rays.

Furthermore, since the thermoplastic resin coloring agent of the present invention preferably employs a 12-hydroxystearic acid metal salt as the oxycarboxylic acid metal salt (B1), it is possible to improve the dispersion of the surface-treated $\alpha$-ferric oxide (A), and obtain a resin molding having high transparency.

Moreover, since the thermoplastic resin coloring agent of the present invention preferably employs calcium 12-hydroxystearate as the 12-hydroxystearic acid metal salt, it can be more suitably used.

Since the thermoplastic resin coloring agent of the present invention includes the surface-treated $\alpha$-ferric oxide (A) formed by coating, with a polyhydric alcohol and an organopolysiloxane, a non-acicular $\alpha$-ferric oxide having an average particle size of 0.01 to 0.06 μm and an aspect ratio of 0.2 to 1.0, and a higher fatty acid metal salt (B2) as the dispersing agent (B), it is possible to disperse the surface-treated $\alpha$-ferric oxide (A) well, impart transparency to the resin molding, and block ultraviolet rays.

Since the thermoplastic resin coloring agent of the present invention preferably employs a polyhydric alcohol or an organopolysiloxane at 0.01 to 10 wt % respectively relative to the entirety of the surface-treated $\alpha$-ferric oxide (A), the surface-treated $\alpha$-ferric oxide (A) does not aggregate, and excellent dispersibility can be obtained.

Furthermore, since the thermoplastic resin coloring agent of the present invention preferably employs trimethylolpropane or trimethylolethane as the polyhydric alcohol, the surface-treated $\alpha$-ferric oxide (A) does not aggregate, and excellent dispersibility can be obtained.

Moreover, since the thermoplastic resin coloring agent of the present invention preferably employs a dimethyl polysiloxane or a methyl hydrogen polysiloxane as the organopolysiloxane, the surface-treated $\alpha$-ferric oxide (A) does not aggregate, and excellent dispersibility can be obtained.

Since the thermoplastic resin coloring agent of the present invention preferably includes 40 to 150 parts by weight of the dispersing agent (B) relative to 100 parts by weight of the surface-treated $\alpha$-ferric oxide (A), the surface-treated $\alpha$-ferric oxide (A) has excellent dispersibility.

Since the thermoplastic resin coloring agent of the present invention further includes the methine-based dye (C) as necessary, it is possible to also block visible rays when a resin molding is formed therefrom.

Furthermore, since the methine-based dye (C) is preferably C.I. No. Solvent Brown 53, a molding can be colored with a brown hue.

The thermoplastic resin composition of the present invention is easily obtained by mixing a thermoplastic resin coloring agent not containing a methine-based dye (C) and a thermoplastic resin, mixing a thermoplastic resin coloring agent not containing a methine-based dye (C), a methine-based dye (C), and a thermoplastic resin, or mixing a thermoplastic resin coloring agent containing a methine-based dye (C) and a thermoplastic resin, and it has excellent handling properties during a production step.

Since the thermoplastic resin in the thermoplastic resin composition of the present invention is preferably a polyester resin, it is possible to obtain a molding having transparency and excellent stretchability and surface smoothness.

Furthermore, since the thermoplastic resin in the thermoplastic resin composition of the present invention is preferably a microbially disintegrable resin, it is possible to obtain a molding having less burden on the environment and excellent stretchability and surface smoothness.

Moreover, since the molding of the present invention has excellent surface smoothness, when the surface is coated with a carbon film, a uniform coating can be obtained. The gas barrier properties are therefore very good.

EXAMPLES

The present invention is explained more specifically by reference to Examples, but the present invention should not be construed as being limited to these Examples. Hereinafter, parts by weight is simply denoted by parts.

Table 1 shows materials used in the present Examples, Table 2 shows surface-treated $\alpha$-ferric oxides, Table 3 shows thermoplastic resin coloring agents, Table 4 shows thermoplastic resin compositions and the composition, etc. of moldings, and Table 5 shows the results of evaluation tests.

TABLE 1

| | |
|---|---|
| $\alpha$-Ferric oxide | FRO-3, average particle size 0.03 μm, aspect ratio 0.9, Sakai Chemical Industry Co., Ltd. |
| Polyhydric alcohol | Trimethylolpropane |
| | Trimethylolethane |
| Organopolysiloxane | Methyl hydrogen polysiloxane |
| | Dimethyl polysiloxane |
| Oxycarboxylic acid metal salt (B1) | Calcium 12-hydroxystearate, Dainichi Kagaku Kogyo K.K. |
| | Magnesium 12-hydroxystearate, Katsuta Kako K.K. |
| Higher fatty acid metal salt (B2) | Calcium stearate, Tannan Kagaku K.K. |
| | Magnesium stearate, Katsuta Kako K.K. |
| Methine-based dye (C) | Polysynthren Brown R, C.I. Solvent Brown 53, Clariant Japan K.K. |
| Other ultraviolet blockers | TINUVIN 234, ultraviolet absorber, Ciba Specialty Chemicals |
| | NOVAPEX U-110, ultraviolet blocking resin, Mitsubishi Chemical Corporation |
| Polyethylene terephthalate (PET) | MITSUI PET SA-135, Mitsui Chemical Co., Ltd. |
| Polycarbonate | IUPILON S-3000 (natural color), Mitsubishi Engineering-Plastic Corporation |
| Polystyrene | A&M polystyrene HF77, A&M Styrene Co., Ltd. |
| Polylactic acid | LACEA H100J, Mitsui Chemical Co., Ltd. |

Surface-treated $\alpha$-Ferric Oxide

A surface treatment agent was added to an $\alpha$-ferric oxide while grinding by means of a jet mill (fluid used: compressed air) to give iron oxides (1) to (6). When a polyhydric alcohol and an organopolysiloxane were used in combination, they were added simultaneously. Each of the surface treatment agents was adjusted to give a predetermined amount of coating based on Table 2 by a known method while changing the weight of iron oxide treated, the supply concentration or the supply flow rate of the treatment agent. Trimethylolpropane was used by dispersing it in ethanol.

TABLE 2

| | Surface-treated $\alpha$-ferric oxide | | | | |
|---|---|---|---|---|---|
| | $\alpha$-Ferric oxide | Polyhydric alcohol | | Organopolysiloxane | |
| | | | | Dimethyl | Methyl hydrogen |
| | FRO-3 | Trimethylolpropane | Trimethylolethane | polysiloxane | polysiloxane |
| Iron oxide (1) | 100 | 0.5 | — | — | 0.5 |
| Iron oxide (2) | 100 | 1 | — | — | 0.5 |
| Iron oxide (3) | 100 | — | 0.5 | 0.5 | — |
| Iron oxide (4) | 100 | 0.5 | — | — | — |
| Iron oxide (5) | 100 | — | — | 0.5 | — |
| Iron oxide (6) | 100 | — | — | — | — |

(units: parts)

Thermoplastic Resin Coloring Agent

The dispersing agents shown in Table 3 were added to 100 parts of the iron oxides (1) to (6) and mixed by a Super Floater to give thermoplastic resin coloring agents (1) to (8).

TABLE 3

| | | Thermoplastic resin coloring agent | | | |
|---|---|---|---|---|---|
| | | Dispersing agent | | | |
| | Iron oxide | Ca 12-hydroxystearate | Mg 12-hydroxystearate | Ca stearate | Mg stearate |
| Coloring agent (1) | Iron oxide (1) | 100 | — | — | — |
| Coloring agent (2) | Iron oxide (1) | — | 100 | — | — |
| Coloring agent (3) | Iron oxide (2) | — | — | 100 | — |
| Coloring agent (4) | Iron oxide (3) | — | — | — | 100 |
| Coloring agent (5) | Iron oxide (4) | 100 | — | — | — |
| Coloring agent (6) | Iron oxide (5) | 100 | — | — | — |
| Coloring agent (7) | Iron oxide (6) | 100 | — | — | — |
| Coloring agent (8) | Iron oxide (6) | — | — | — | — |

(units: parts)

Thermoplastic Resin Composition

Examples 1 to 10, Comparative Examples 1 to 4

As described in Table 4, each of the thermoplastic resin coloring agents (1) to (8) was added to 100 parts of the resin, mixed by a Henschel mixer, and extruded by a single shaft extruder to give thermoplastic resin compositions (1) to (14) in the form of pellets.

Comparative Example 5

0.24 parts of TINUVIN 234 (manufactured by Ciba Specialty Chemicals) was added as a ultraviolet absorber to 99.76 parts of PET, mixed by a Henschel mixer, and extruded by a single shaft extruder to give a thermoplastic resin composition (15) in the form of pellets.

Comparative Example 6

0.24 parts of the ultraviolet blocking resin NOVAPEX U-110 (manufactured by Mitsubishi Chemical Corporation) was added to 99.76 parts of PET, mixed by a Henschel mixer, and extruded by a single shaft extruder to give a thermoplastic resin composition (16) in the form of pellets.

Molding

As described in Table 4, 100 parts of the base resin used for each of the thermoplastic resin compositions (1) to (14) and 6 parts of the thermoplastic resin composition were subjected to tumbling and made into a 500 mL capacity biaxially stretched bottle using a Stretch Blow molding machine manufactured by Nissei ASB Machine Co., Ltd.

Furthermore, biaxially stretched bottles were made in the same manner as above using 100 parts of thermoplastic resin compositions (15) and (16), which had been dried at 160° C. for 4 hours.

[Table 4]

| | Thermoplastic resin composition | | | | | | | Molding | | | | |
|---|---|---|---|---|---|---|---|---|---|---|---|---|
| | Thermoplastic resin | | | | Thermoplastic resin coloring agent | Methine-based dye | Thermoplastic resin composition | Thermoplastic resin | | | | Thermoplastic resin composition |
| | PET | Poly-carbonate | Poly-styrene | Poly-lactate | | | | PET | Poly-carbonate | Poly-styrene | Poly-lactate | |
| Ex. 1 | 100 | — | — | — | (1) 8.5 | — | Resin comp. (1) | 100 | — | — | — | (1) 6 |
| Ex. 2 | 100 | — | — | — | (1) 8.5 | 0.2 | Resin comp. (2) | 100 | — | — | — | (2) 6 |
| Ex. 3 | 100 | — | — | — | (1) 8.5 | 0.7 | Resin comp. (3) | 100 | — | — | — | (3) 6 |
| Ex. 4 | 100 | — | — | — | (1) 8.5 | 1.5 | Resin comp. (4) | 100 | — | — | — | (4) 6 |
| Ex. 5 | — | 100 | — | — | (1) 8.5 | — | Resin comp. (5) | — | 100 | — | — | (5) 6 |
| Ex. 6 | — | — | 100 | — | (1) 8.5 | — | Resin comp. (6) | — | — | 100 | — | (6) 6 |
| Ex. 7 | — | — | — | 100 | (1) 8.5 | — | Resin comp. (7) | — | — | — | 100 | (7) 6 |
| Ex. 8 | 100 | — | — | — | (2) 8.5 | — | Resin comp. (8) | 100 | — | — | — | (8) 6 |
| Ex. 9 | 100 | — | — | — | (3) 8.5 | — | Resin comp. (9) | 100 | — | — | — | (9) 6 |
| Ex. 10 | 100 | — | — | — | (4) 8.5 | — | Resin comp. (10) | 100 | — | — | — | (10) 6 |
| Comp. Ex. 1 | 100 | — | — | — | (5) 8.5 | — | Resin comp. (11) | 100 | — | — | — | (11) 6 |
| Comp. Ex. 2 | 100 | — | — | — | (6) 8.5 | — | Resin comp. (12) | 100 | — | — | — | (12) 6 |
| Comp. Ex. 3 | 100 | — | — | — | (7) 8.5 | — | Resin comp. (13) | 100 | — | — | — | (13) 6 |
| Comp. Ex. 4 | 100 | — | — | — | (8) 8.5 | — | Resin comp. (14) | 100 | — | — | — | (14) 6 |

-continued

| | Thermoplastic resin composition | | | | | | | Molding | | | | |
|---|---|---|---|---|---|---|---|---|---|---|---|---|
| | Thermoplastic resin | | | | Thermoplastic resin coloring agent | Methine-based dye | Thermoplastic resin composition | Thermoplastic resin | | | | Thermoplastic resin composition |
| | PET | Poly-carbonate | Poly-styrene | Poly-lactate | | | | PET | Poly-carbonate | Poly-styrene | Poly-lactate | |
| Comp. Ex. 5 | 99.76 | — | — | — | TINUVIN 0.24 | — | Resin comp. (15) | — | — | — | — | (15) 100 |
| Comp. Ex. 6 | 99.76 | — | — | — | NOVAPEX 0.24 | — | Resin comp. (16) | — | — | — | — | (16) 100 |

(units: parts)

DLC Film Formation

In bottle DLC film formation equipment, an inner surface of each bottle was coated uniformly with a DLC at a thickness of 300 Å by introducing into the interior of the container acetylene gas as a starting material gas and argon as an auxiliary gas under conditions of a high frequency wave output of 500 W, a starting material gas pressure of 0.3 torr, and a supply gas flow rate of 75 mL/min. (the thickness of the DLC film was measured by masking the inner surface of the bottle with an Magic Marker (trademark) in advance, coating with the DLC, then removing the masking with diethyl ether, etc., and using a DECTACK3 surface profiler manufactured by Vecco).

Evaluation (1) Limiting Viscosity ($\eta$) and Limiting Viscosity Retention of Thermoplastic Resin Composition Thermoplastic resin compositions containing a resin at 0.1 g, 0.3 g, and 0.5 g were prepared and used as samples.

Limiting Viscosity ($\eta$)

A resin component in the thermoplastic resin composition was dissolved in 100 mL of a mixed solvent of phenol/tetrachloroethane=50/50 (ratio by weight), after $\alpha$-ferric oxide particles were removed by centrifugation the viscosity of each resin solution was measured at 30° C., the value of viscosity/concentration was plotted against the concentration in accordance with a standard method, and a limiting viscosity ($\eta$) was determined by extrapolating the concentration to 0. As a blank, the resin was used on its own.

The limiting viscosity shows the state of degradation (hydrolysis) of a resin; the higher the value, the more the resin degradation is suppressed.

Limiting Viscosity Retention

The value of (limiting viscosity of resin in thermoplastic resin composition/limiting viscosity of blank)×100 was obtained. The closer this value is to 100 (the closer the limiting viscosity of the resin in the thermoplastic resin composition is to the limiting viscosity of the blank), the more the degradation of the resin in the thermoplastic resin composition is suppressed.

(2) Light Blocking Properties and Transparency of Molding

An area of a 0.3 mm thick bottle body was cut out to give a sample, and the evaluation tests below were carried out.

Light Blocking Ratio

Measured at four wavelengths of 380, 400, 420, and 550 nm using air as a blank (100%) by means of a UV-265FW manufactured by Shimadzu Corporation.

◎: at least 99% blocking ratio
○: at least 96% blocking ratio
Δ: at least 70% blocking ratio
x: less than 70% blocking ratio Transparency Measured using air as a blank (0) by means of a Haze Guard Plus manufactured by BYK-chemie Japan K.K. For moldings produced from a molding resin alone, the value was generally around 1. When transparency is high, the value is low, and when cloudiness is high the value is high. For a haze value of 15 or greater, an obvious cloudiness can be confirmed by visual observation.

◎: no greater than 4
○: no greater than 6
Δ: no greater than 10
x: greater than 10

(3) Surface Smoothness and Gas Barrier Properties of Molding Provided with a DLC An area of a 0.3 mm thick bottle body provided with a DLC was cut out to give a sample, and the surface smoothness of the bottle inner surface was evaluated. Furthermore, the gas permeability was evaluated using the bottle.

Evaluation of Surface Smoothness of Bottle Inner Surface

The surface was examined using an AFM (manufactured by Seiko Instruments), the maximum height of projections was measured, and evaluation was made in accordance with the criteria below.

◎: less than 0.5 μm
○: less than 0.8 μm
Δ: less than 1 μm
x: equal to or greater than 1 μm Gas Barrier Properties The oxygen permeability of the bottle was measured at 25° C. using an OX-TRANT 100 manufactured by MODERN CONTROL, and evaluation was made in accordance with the criteria below. When a DLC film was not formed for a bottle obtained in Example 1, the evaluation was x.

◎: less than 0.0010 mL/bottle·24 hours·atm
○: less than 0.0030 mL/bottle·24 hours·atm
Δ: less than 0.0050 mL/bottle·24 hours·atm
x: equal to or greater than 0.0050 mL/bottle·24 hours·atm

TABLE 5

Results of evaluation tests

| | Thermoplastic resin composition | | Molding | | | | | | |
|---|---|---|---|---|---|---|---|---|---|
| | Limiting viscosity (η) | Limiting viscosity retention | Light blocking ratio (%) | | | | Transparency | Surface smoothness | Gas barrier properties |
| | | | 380 nm | 400 nm | 420 nm | 550 nm | | | |
| Ex. 1 | 0.75 | 91 | ◎ | ◎ | ◎ | X | ◎ | ◎ | ◎ |
| Ex. 2 | 0.75 | 91 | ◎ | ◎ | ◎ | △ | ◎ | ◎ | ◎ |
| Ex. 3 | 0.75 | 91 | ◎ | ◎ | ◎ | △ | ◎ | ◎ | ◎ |
| Ex. 4 | 0.75 | 91 | ◎ | ◎ | ◎ | ○ | ◎ | ◎ | ◎ |
| Ex. 5 | — | — | ◎ | ◎ | ◎ | X | ◎ | ◎ | ◎ |
| Ex. 6 | — | — | ◎ | ◎ | ◎ | X | ○ | ◎ | ◎ |
| Ex. 7 | 1.7 | 90 | ◎ | ◎ | ◎ | X | ○ | ◎ | ◎ |
| Ex. 8 | 0.72 | 88 | ◎ | ◎ | ◎ | X | ○ | ◎ | ◎ |
| Ex. 9 | 0.6 | 73 | ◎ | ◎ | ◎ | X | ○ | ◎ | ◎ |
| Ex. 10 | 0.66 | 80 | ◎ | ◎ | ◎ | X | ○ | ◎ | ◎ |
| Comp. Ex. 1 | 0.75 | 91 | ◎ | ◎ | ◎ | X | ○ | ○ | ○ |
| Comp. Ex. 2 | 0.75 | 91 | ◎ | ◎ | ◎ | X | ○ | △ | △ |
| Comp. Ex. 3 | 075 | 91 | ◎ | ◎ | ◎ | X | X | X | X |
| Comp. Ex. 4 | 0.55 | 67 | △ | △ | △ | X | X | X | X |
| Comp. Ex. 5 | 0.75 | 91 | ○ | X | X | X | ○ | ◎ | ○ to X* |
| Comp. Ex. 6 | 0.75 | 91 | ○ | X | X | X | ○ | ◎ | ○ to X* |

*If ultraviolet blocker, etc. bleeds, the gas barrier properties are lost.

Industrial Applicability

The thermoplastic resin coloring agent and the thermoplastic resin composition employing same of the present invention are preferably used in a molding that is required to have excellent transparency, surface smoothness, ultraviolet blocking properties, etc.

The molding of the present invention is useful for storage stability of contents in an alcoholic bottle container such as a beer container, and food safety (freshness retention) in a food container such as a tray, and can also be used in food packaging, cosmetic packaging, etc. Furthermore, it can be expected to exhibit ultraviolet ray blocking in a carport, etc. employing an acrylic resin or a polycarbonate resin or to improve the productivity of agricultural produce due to blocking of ultraviolet rays or visible rays in agricultural films and sheets. Moreover, the molding of the present invention can preferably be used for DLC film formation because of excellent surface smoothness, and can be used in food packaging, cosmetic packaging/containers, etc. instead of glass bottles because of the gas barrier properties.

Furthermore, when the molding of the present invention is a film (including a shrink film), by wrapping an object therewith it becomes possible to easily block ultraviolet rays and visible rays and provide a gas barrier while maintaining transparency.

The invention claimed is:

1. A thermoplastic resin coloring agent comprising: a surface-treated α-ferric oxide (A) formed by coating a non-acicular α-ferric oxide having an average particle size of 0.01 to 0.06 μm and an aspect ratio of 0.2 to 1.0 with a polyhydric alcohol and an organopolysiloxane, and an oxycarboxylic acid metal salt (B1) as a dispersing agent (B).

2. The thermoplastic resin coloring agent according to claim 1, wherein the oxycarboxylic acid metal salt (B1) is a 12-hydroxystearic acid metal salt.

3. The thermoplastic resin coloring agent according to claim 2, wherein the 12-hydroxystearic acid metal salt is calcium 12-hydroxystearate.

4. A thermoplastic resin coloring agent comprising a surface-treated α-ferric oxide (A) formed by coating a non-acicular α-ferric having an average particle size of 0.01 to 0.06 μm and an aspect ratio of 0.2 to 1.0 with a polyhydric alcohol and an organopolysiloxane, and a higher fatty acid metal salt (B2) as a dispersing agent (B).

5. The thermoplastic resin coloring agent according to claim 1, wherein the polyhydric alcohol and the organopolysiloxane are each 0.01 to 10 wt % relative to the entirety of the surface-treated α-ferric (A).

6. The thermoplastic resin coloring agent according to claim 1, wherein the polyhydric alcohol is trimethylolpropane or trimethylolethane.

7. The thermoplastic resin coloring agent according to claim 1, wherein the organopolysiloxane is dimethyl polysiloxane or methyl hydrogen polysiloxane.

8. The thermoplastic resin coloring agent according to claim 1, wherein 40 to 150 parts by weight of the dispersing agent (B) is added to 100 parts by weight of the surface-treated α-ferric oxide (A).

9. The thermoplastic resin coloring agent according to claim 1, wherein the thermoplastic resin coloring agent comprises a methine-based dye (C).

10. The thermoplastic resin coloring agent according to claim 9, wherein the methine-based dye (C) is C.I. No. Solvent Brown 53.

11. A thermoplastic resin composition obtained by mixing the thermoplastic resin coloring agent according to claim 1, a methine-based dye (C), and a thermoplastic resin.

12. The thermoplastic resin composition according to claim 11, wherein the methine-based dye (C) is C.I. No. Solvent Brown 53.

13. A thermoplastic resin composition obtained by mixing the thermoplastic resin coloring agent according to claim 1, and a thermoplastic resin.

14. The thermoplastic resin composition according to claim 11, wherein the thermoplastic resin is a polyester resin.

15. The thermoplastic resin composition according to claim 11, wherein the thermoplastic resin is a microbially disintegrable resin.

16. A molding obtained by using the thermoplastic resin coloring agent according to claim 1.

17. A molding obtained by using the thermoplastic resin composition according to claim 11.

18. A molding formed by coating the surface of the molding according to claim 16 with a carbon film.

19. The thermoplastic resin coloring agent according to claim 4, wherein the polyhydric alcohol and the organopolysiloxane are each 0.01 to 10 wt % relative to the entirety of the surface-treated α-ferric oxide (A).

20. The thermoplastic resin coloring agent according to claim 4, wherein the polyhydric alcohol is trimethylolpropane or trimethylolethane.

21. The thermoplastic resin coloring agent according to claim 4, wherein the organopolysiloxane is dimethyl polysiloxane or methyl hydrogen polysiloxane.

22. The thermoplastic resin coloring agent according to claim 4, wherein 40 to 150 parts by weight of the dispersing agent (B) is added to 100 parts by weight of the surface-treated α-ferric oxide (A).

23. The thermoplastic resin coloring agent according to claim 4, wherein the thermoplastic resin coloring agent comprises a methine-based dye (C).

24. The thermoplastic resin coloring agent according to claim 23, wherein the methine-based dye (C) is C.I. No. Solvent Brown 53.

25. A thermoplastic resin composition obtained by mixing the thermoplastic resin coloring agent according to claim 4, a methine-based dye (C), and a thermoplastic resin.

26. The thermoplastic resin composition according to claim 25, wherein the methine-based dye (C) is C.I. No. Solvent Brown 53.

27. A thermoplastic resin composition obtained by mixing the thermoplastic resin coloring agent according to claim 4, and a thermoplastic resin.

28. The thermoplastic resin composition according to claim 25, wherein the thermoplastic resin is a polyester resin.

29. The thermoplastic resin composition according to claim 25, wherein the thermoplastic resin is a microbially disintegrable resin.

30. A molding obtained by using the thermoplastic resin coloring agent according to claim 4.

31. A molding obtained by using the thermoplastic resin composition according to claim 25.

32. A molding formed by coating the surface of the molding according to claim 30 with a carbon film.

* * * * *